US011506099B1

(12) United States Patent
Harris et al.

(10) Patent No.: US 11,506,099 B1
(45) Date of Patent: Nov. 22, 2022

(54) ELECTRICALLY-HEATED MIX PIPE FOR PROCESSING DIESEL EXHAUST FLUID IN A SELECTIVE CATALYTIC REDUCTION SYSTEM

(71) Applicants: Tenneco Automotive Operating Company Inc., Lake Forest, IL (US); Tenneco GmbH, Edenkoben (DE)

(72) Inventors: Thomas M. Harris, Jackson, MI (US); Eric A. Hein, Neustadt-Diedesfeld (DE)

(73) Assignees: Tenneco Automotive Operating Company Inc., Lake Forest, IL (US); Tenneco GmbH, Edenkoben (DE)

( * ) Notice: Subject to any disclaimer, the term of this patent is extended or adjusted under 35 U.S.C. 154(b) by 0 days.

(21) Appl. No.: 17/410,147

(22) Filed: Aug. 24, 2021

(51) Int. Cl.
*F01N 3/20* (2006.01)

(52) U.S. Cl.
CPC ......... *F01N 3/2013* (2013.01); *F01N 3/2066* (2013.01); *F01N 2240/16* (2013.01); *F01N 2530/04* (2013.01); *F01N 2570/14* (2013.01); *F01N 2610/02* (2013.01); *F01N 2610/1453* (2013.01)

(58) Field of Classification Search
CPC combination set(s) only.
See application file for complete search history.

(56) References Cited

U.S. PATENT DOCUMENTS

| 8,061,123 | B2 * | 11/2011 | Driscoll | F01N 3/208 60/303 |
| 9,464,558 | B2 | 10/2016 | Tobben et al. | |
| 10,570,796 | B2 | 2/2020 | Kurpejovic et al. | |
| 10,577,995 | B2 * | 3/2020 | Ker | B01F 23/2132 |
| 10,934,918 | B1 * | 3/2021 | Goffe | B01D 53/9427 |
| 2005/0013756 | A1 * | 1/2005 | Amou | B01D 53/9495 422/177 |
| 2015/0267596 | A1 * | 9/2015 | Tobben | F01N 13/14 60/274 |
| 2018/0371978 | A1 * | 12/2018 | Sampath | F01N 5/025 |
| 2019/0112962 | A1 * | 4/2019 | Gaiser | H05B 1/0236 |

FOREIGN PATENT DOCUMENTS

| DE | 102004020138 B4 | 2/2007 |
| EP | 0930422 B1 | 7/2002 |
| EP | 2268904 B1 | 11/2011 |
| JP | 4290081 B2 | 7/2009 |

\* cited by examiner

*Primary Examiner* — Binh Q Tran
(74) *Attorney, Agent, or Firm* — Harness, Dickey & Pierce, P.L.C.

(57) ABSTRACT

An exhaust treatment assembly for receiving exhaust gas from a motor vehicle includes a mix pipe, a sheath, and a heater. The mix pipe at least partially defines a passage adapted to receive the exhaust gas and a chemical reductant. The sheath includes a first end fluidly sealed to the mix pipe. At least a portion of the sheath is radially spaced apart from the mix pipe to at least partially define a gap. The heater is disposed in the gap. The heater is adapted to heat a reductant impingement surface.

20 Claims, 7 Drawing Sheets

ELECTRICALLY-HEATED MIX PIPE FOR PROCESSING DIESEL EXHAUST FLUID IN A SELECTIVE CATALYTIC REDUCTION SYSTEM

FIELD

The present disclosure relates to an electrically heated mix pipe for processing diesel exhaust fluid in a selective catalytic reduction (SCR) System.

BACKGROUND

This section provides background information related to the present disclosure which is not necessarily prior art.

Motor vehicles typically have an exhaust system that transports hot exhaust gases from an internal combustion engine powering the motor vehicle to the outside environment. Such exhaust systems typically include various exhaust components, including without limitation, headers, down pipes, x-pipes, exhaust pipes, and mufflers. Depending on the type of fuel source used to power the internal combustion engine in the motor vehicle (e.g., gasoline versus diesel), the exhaust system may include additional exhaust components that provide emissions control, including without limitation, catalytic converters, reductant injectors, selective catalytic reduction (SCR) units, diesel oxidation catalysts (DOC), and diesel particulate filters (DPF).

The emission of NOx from a diesel engine may be controlled with one or more SCR units. The SCR units may include a catalyst that speeds up the rate of the reaction of NOx with a chemical reductant. The chemical reductant is introduced into the exhaust upstream of the catalyst. Diesel exhaust fluid (DEF) is a chemical reductant including a solution of urea in water. DEF may be sprayed into exhaust as small droplets that evaporate and then thermally decompose. Ammonia, one of the products of the decomposition, may react with NOx in the catalyst. The exhaust system may further include a mixer downstream of the point of DEF introduction to accelerate processing of the DEF and distribute the resulting ammonia.

SUMMARY

This section provides a general summary of the disclosure, and is not a comprehensive disclosure of its full scope or all of its features.

The present disclosure provides an exhaust treatment assembly for receiving exhaust gas from a motor vehicle. The exhaust treatment assembly includes a mix pipe, a sheath, and a heater. The mix pipe at least partially defines a passage adapted to receive the exhaust gas and a chemical reductant. The sheath includes a first end fluidly sealed to the mix pipe. At least a portion of the sheath is radially spaced apart from the mix pipe to at least partially define a gap. The heater is disposed in the gap. The heater is adapted to heat a reductant impingement surface.

In some configurations, the sheath is disposed radially inside of the mix pipe. The heater is coupled to a radially-outer surface of the sheath. The reductant impingement surface is at least a portion of a radially-inner surface of the sheath.

In some configurations, the mix pipe defines a first length. The sheath defines a second length less than the first length.

In some configurations, the sheath defines a wall thickness ranging from 0.75 mm to 2 mm.

In some configurations, the sheath is disposed radially outside of the mix pipe. The heater is coupled to a radially-outer surface of the mix pipe. The reductant impingement surface is at least a portion of a radially-inside surface of the mix pipe.

In some configurations, the first end is an upstream end.

In some configurations, the sheath further includes second end opposite the first end. The second end is adapted to be in direct contact with the mix pipe.

In some configurations, the reductant impingement surface is a portion of an inner passage surface. The portion is less than 100%.

In some configurations, the heater includes a first heater and a second heater. The second heater is disposed downstream of the first heater. The first heater and the second heater are independently operable.

In some configurations, the heater defines a substantially annular shape.

In some configurations, the sheath includes stainless steel.

In some configurations, the exhaust treatment further includes a thermally-insulating material. The thermally-insulating material is disposed around at least a portion of at least one of the mix pipe and the sheath.

In some configurations, the exhaust treatment assembly further includes a mixer fluidly connected to the passage. The mixer is upstream of the heater.

In some configurations, the exhaust treatment assembly further includes a chemical reductant injector. The chemical reductant injector is adapted to spray the chemical reductant into the passage. The chemical reductant injector is disposed upstream of the heater.

In some configurations, the exhaust treatment assembly further includes a selective catalytic reduction (SCR) unit. The SCR unit is downstream of the mix pipe.

The present disclosure provides a method of reducing chemical reductant deposits in an exhaust system of a vehicle. The method includes providing an exhaust gas and a chemical reductant to a passage of an exhaust treatment component. The exhaust treatment component includes a mix pipe, a sheath, and a heater. The mix pipe at least partially defines the passage. The sheath is radially spaced apart from the mix pipe to at least partially define a gap. A first end of the sheath is fluidly sealed to the mix pipe. The heater is disposed in the gap. The method further includes impinging the chemical reductant on a reductant impingement surface of the passage. The method further includes heating the reductant impingement surface with the heater.

In some configurations, heating includes bring the reductant impingement surface to a temperature ranging from 135° C. to 275° C.

In some configurations, heating includes supplying power to the heater in an amount ranging from 1 kW to 2 kW.

In some configurations, the heater includes a first heater and a second heater. The first heater and the second heater are independently operable.

In some configurations, the method further includes determining a region of high reductant impingement flux on the reductant impingement surface. Heating the reductant impingement surface includes operating at least one of the first heater and the second heater based on the region of maximum reductant impingement.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
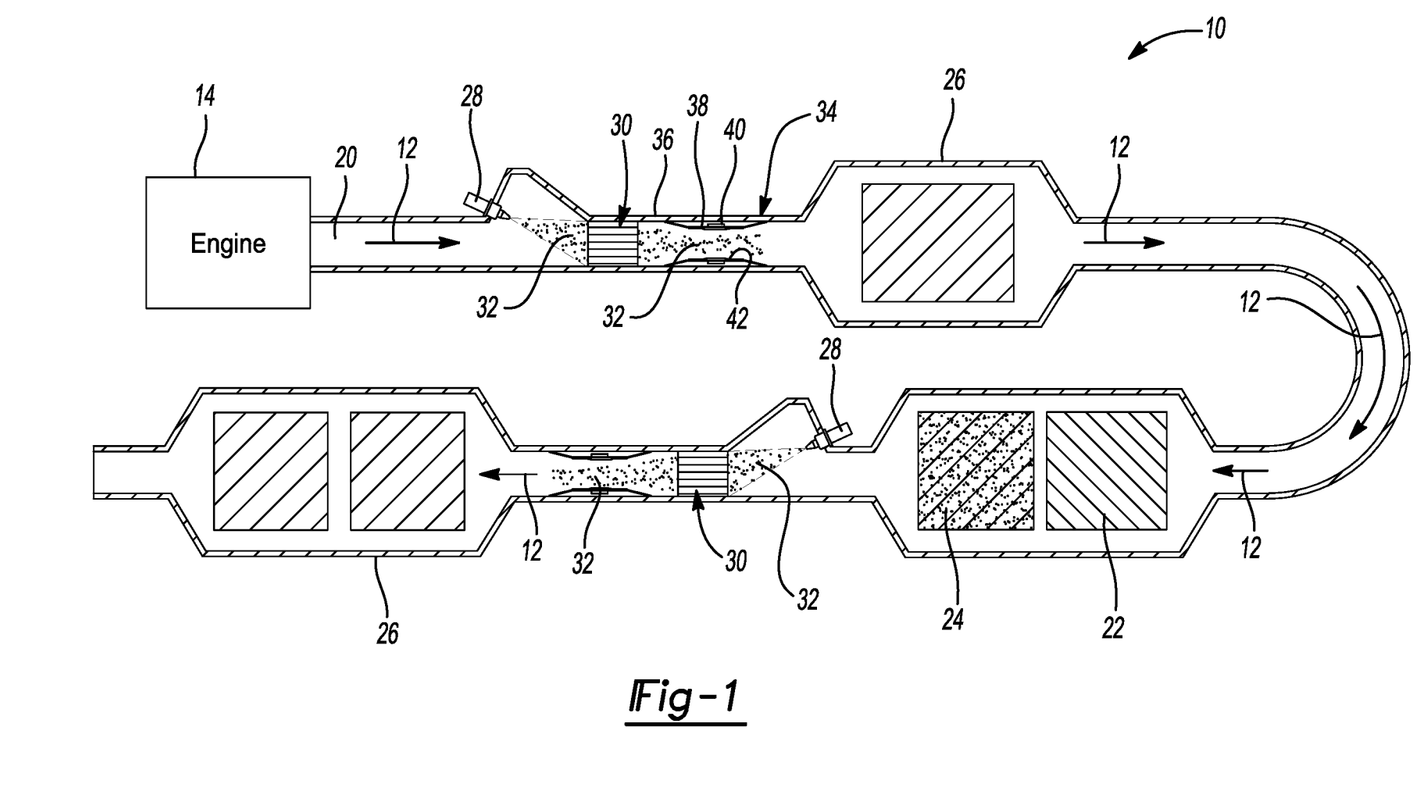
FIG. 1 is a schematic representation of an exhaust system according to the principles of the present disclosure.

Referring to FIG. 1, an exhaust treatment system 10 according to the principles of the present disclosure is provided. The exhaust treatment system 10 may treat exhaust gas 12 output by a combustion engine 14. The exhaust treatment system 10 may include an exhaust gas passage 20, an oxidation catalyst 22 (e.g., a diesel oxidation catalyst (DOC)), a filter 24 (e.g., a diesel particulate filter (DPF)), one or more selective catalytic reduction (SCR) units 26, one or more respective chemical reductant injectors 28, and one or more respective mixers 30. The oxidation catalyst 22, the filter 24, the SCR units 26, and the mixers 30 are disposed within the exhaust gas passage 20 such that some or all of the exhaust gas 12 output from the engine 14 flows therethrough.

The exhaust treatment system 10 may have two SCR units 26, as shown, and may be referred to as a "dual dosing system." One of the SCR units 26 may be disposed downstream of the oxidation catalyst 22 and the filter 24 and the other of the SCR units 26 may be disposed upstream of the oxidation catalyst 22 and the filter 24. However, in other examples, an exhaust treatment system may have a single SCR unit. The single SCR unit may be disposed downstream of an oxidation catalyst and a filter or upstream of an oxidation catalyst and a filter.

Figure 2A:
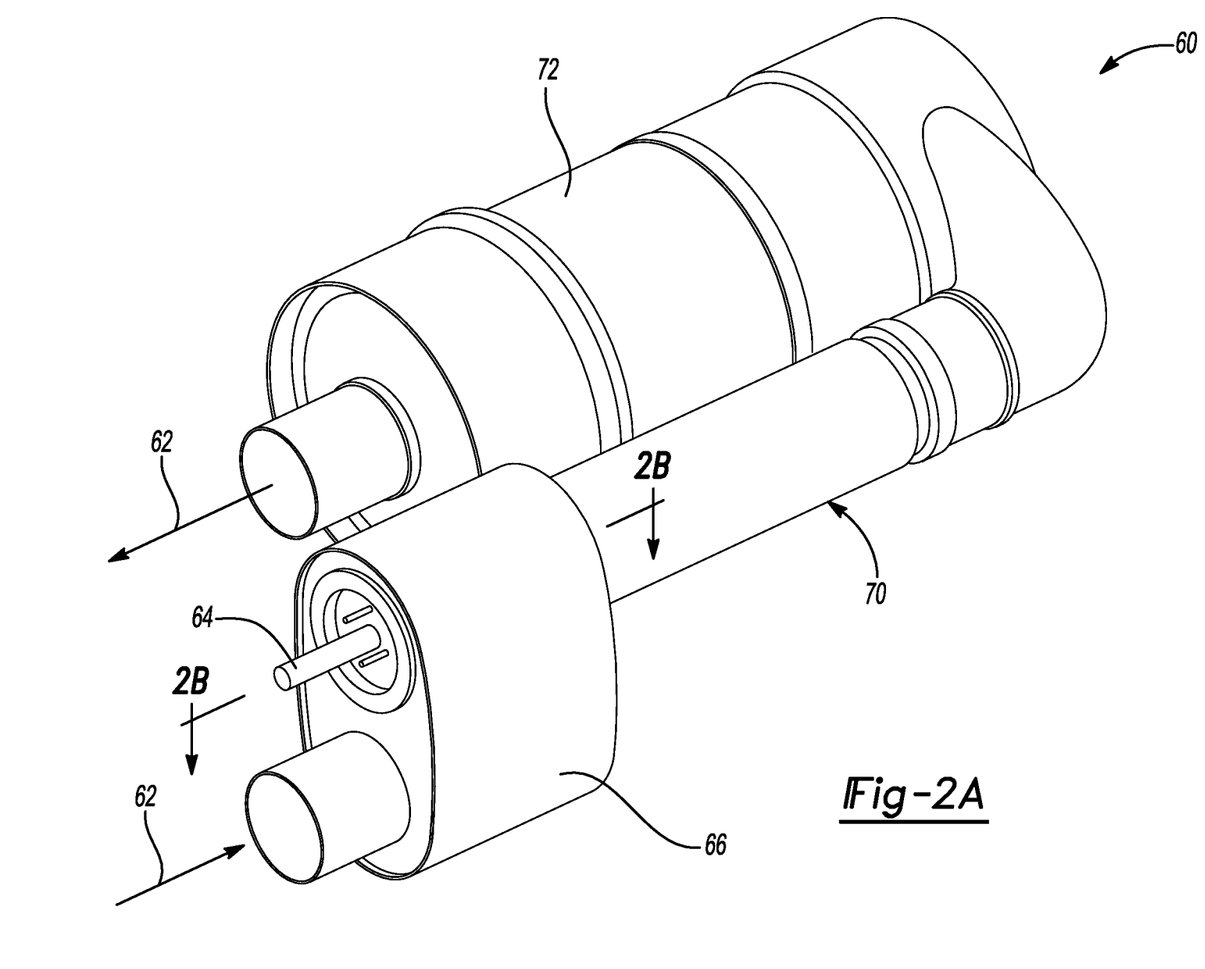
FIG. 2A is a perspective view of an exhaust treatment assembly according to the principles of the present disclosure.
Figure 2B:
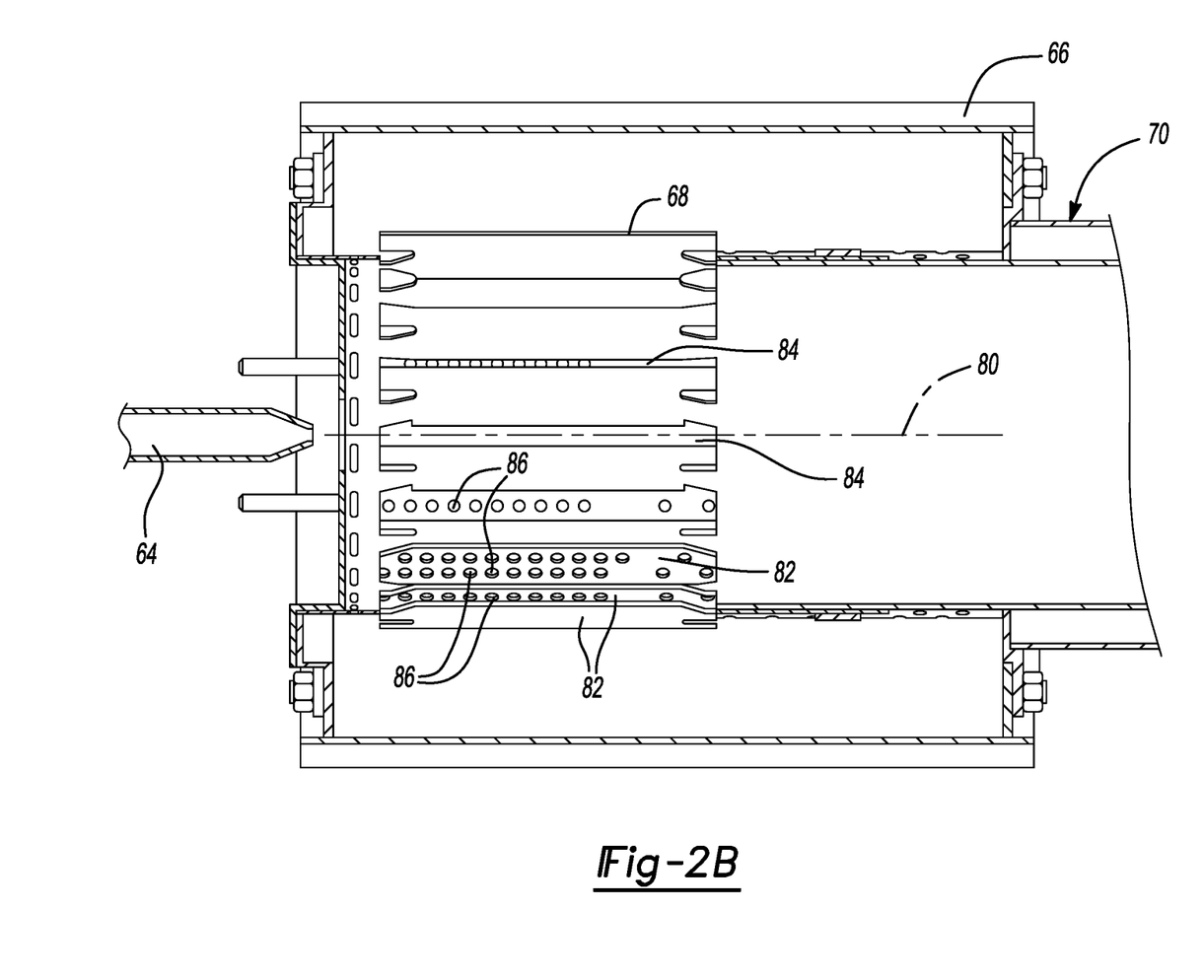
FIG. 2B is a sectional view of a mix box of the exhaust treatment assembly of FIG. 2A.
Figure 5:
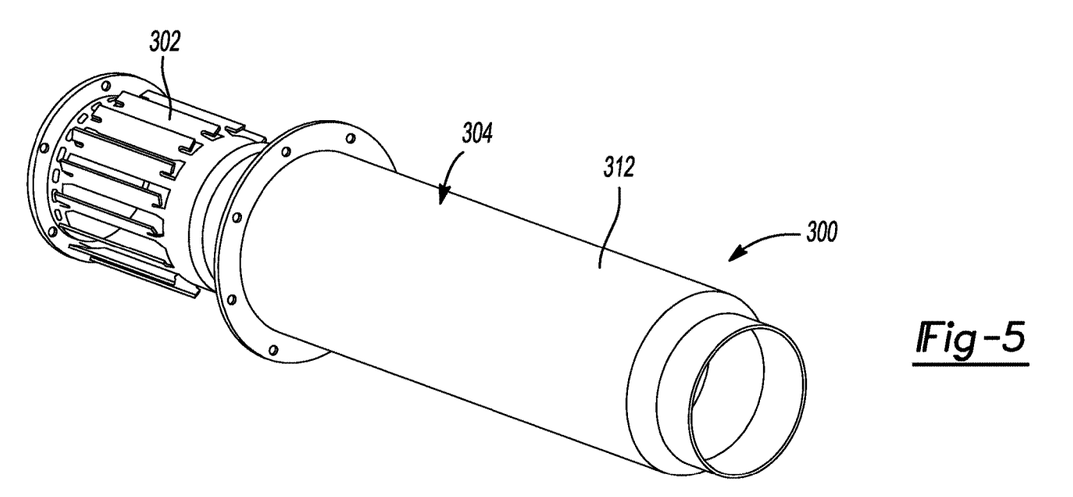
FIG. 5 is a perspective view of an exhaust treatment assembly according to the principles of the present disclosure.
Figure 6:
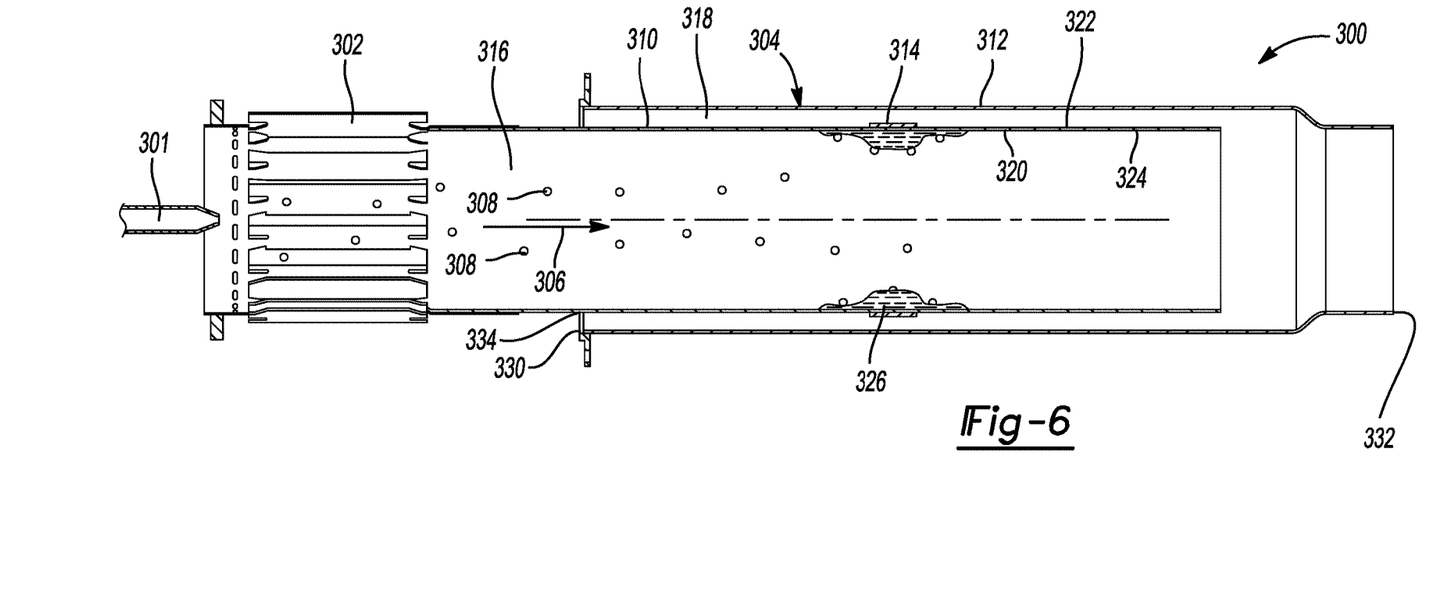
FIG. 6 is a sectional view of the exhaust treatment assembly of FIG. 5.

The mixers 30 may be non-impingement mixers, as shown (see also mixer 68 of FIG. 2B and mixer 302 of FIGS. 5-6). A non-impingement mixer may have a generally annular shape. The non-impingement mixer include a plurality of axially-extending, circumferentially-spaced louvers. In some examples, all or a portion of the louvres may define a plurality of apertures (see, e.g., mixer 68 of FIG. 2B). Non-impingement mixers are adapted to receive exhaust gas and create a vortex of exhaust gas and air into which a chemical reductant is injected. The vortex may resemble a tornado having an axis substantially parallel to a direction of flow of the exhaust gas. The reductant may remain substantially airborne within the non-impingement mixer due to the turbulence of the exhaust gas vortex created by the non-impingement mixer. In other examples, an exhaust treatment system may include an impingement mixer that has surfaces adapted to be directly impinged or contacted by chemical reductant from a reductant injector.

With continued reference to FIG. 1, each of the reductant injectors 28 may be disposed upstream of a respective SCR unit 26, as shown. However, in other examples, a reductant injector may be disposed partially within a mixer or integral with the mixer. Each of the reductant injectors 28 may receive a reductant 32 from a reductant tank (not shown) and inject the reductant 32 as a spray cone of liquid reductant droplets into the exhaust gas 12, upstream of or into the mixer 30. When the mixer 30 is a non-impingement mixer, as shown, the spray cone of reductant 32 may be directed toward a center of the mixer 30 rather than on walls of the exhaust treatment system 10 or surfaces of the mixer 30. The mixer 30 may be adapted to create a vortex of the exhaust gas 12 that substantially retains the reductant 32 to reduce or prevent contact of the reductant 32 with surfaces of the mixer 30.

The exhaust gas 12 and the reductant 32 are mixed within the mixer 30 and/or downstream of the mixer 30 after being discharged into a mix tube subassembly 34. Each of the mix tube subassemblies 34 is disposed downstream of and axially spaced apart from a respective one of the reductant injectors 28 and a respective one of the mixers 30. Each of the mix tube subassemblies 34 is disposed upstream of and axially spaced apart from a respective one of the SCR units 26.

The mix tube subassembly 34 includes a mix tube 36, a sheath 38, and a heater 40. The sheath 38 may be disposed within the mix tube 36, as shown. However, in other examples, a sheath may be disposed at least partially outside of a mix tube (see, e.g., mix tube subassembly 304 of FIG. 6). The heater 40 may be disposed within a gap 42 between the mix tube 36 and the sheath 38, such as on an outside surface of the sheath 38, as shown. Accordingly, the heater 40 may be disposed downstream of and axially spaced apart from the reductant injector 28 and the mixer 30. The heater 40 may be disposed upstream of and axially spaced apart from the SCR unit 26.

The reductant 32 may be heated by the exhaust gas 12 in the mixer and/or the mix tube subassembly 34. A portion of the reductant 32 may evaporate and thermally decompose while airborne. For example, the reductant 32 may be DEF, which includes a solution of urea in water. The urea may decompose into gaseous products including ammonia.

Another portion of the reductant may not heated enough to evaporate and decompose, such as in a case of low exhaust enthalpy rates and/or high reductant introduction rates. The portion of the reductant 32 that does not decompose may land as liquid droplets on a surface of the mix tube subassembly 34. The portion of the reductant 32 may impinge an inside surface of the mixer subassembly 34, referred to as a reductant impingement surface 42. The reductant impingement surface 42 is a surface on which the liquid reductant 28 lands or impinges after being airborne in the exhaust gas vortex created by the mixer 30 and prior to evaporating and decomposing. The reductant impingement surface 42 is downstream of the mixer 30 and upstream of the SCR unit 26. The reductant impingement surface 42 may be on an inside surface of the sheath 38, as shown, and/or on an inside surface of the mix pipe 36.

Figure 3:
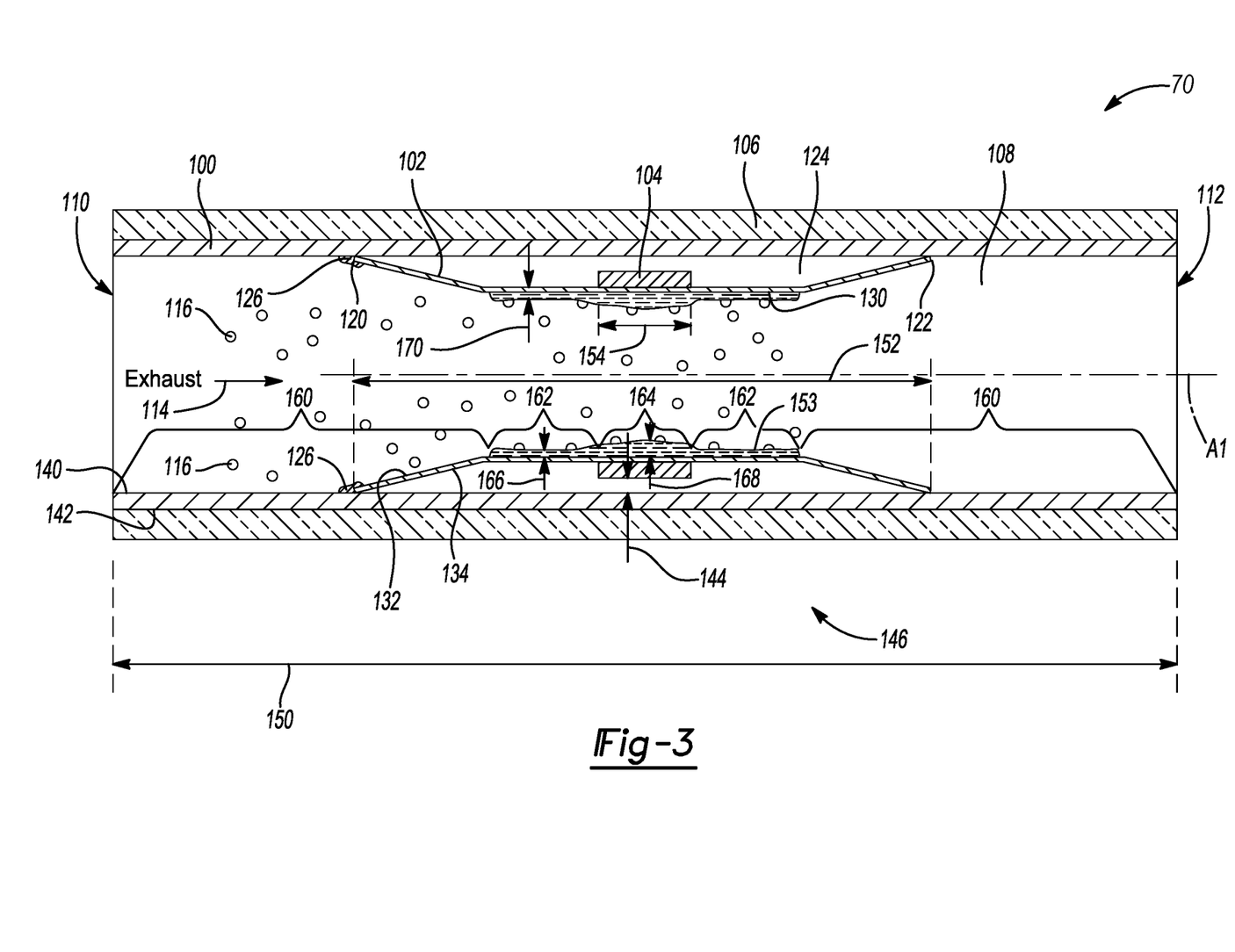
FIG. 3 is a sectional view of a mix tube subassembly of the exhaust treatment assembly of FIG. 2A according to the principles of the present disclosure.
Figure 4:
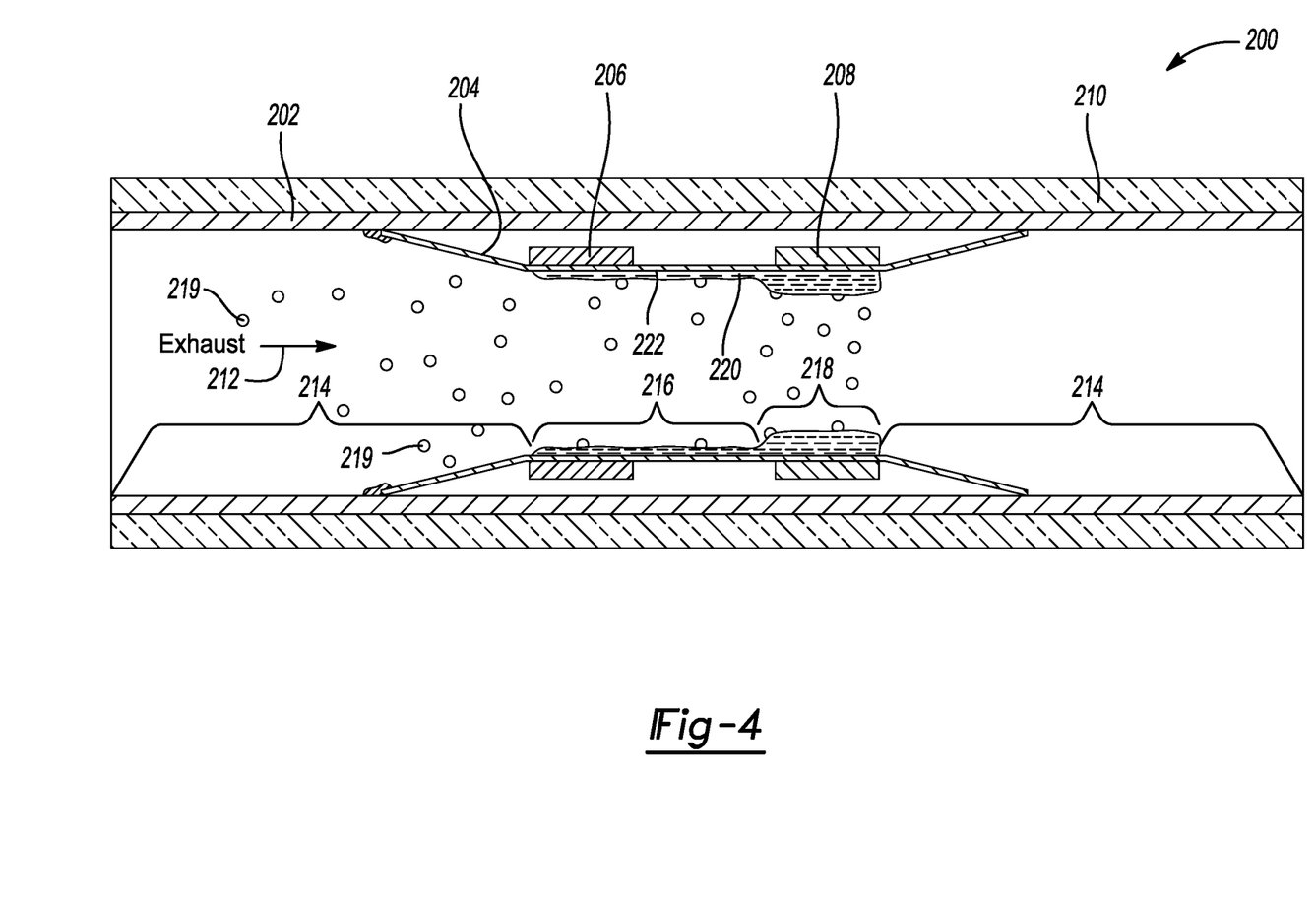
FIG. 4 is a sectional view of another mix tube subassembly according to the principles of the present disclosure.

The reductant 32 may form a liquid film on the reductant impingement surface 42 (see, e.g., film 153 in FIG. 3, film 220 in FIG. 4, film 326 in FIG. 6). The heater 40 may be adapted to heat the reductant 32 on the reductant impingement surface 42 to vaporize and thermally decompose the reductant 32. Downstream of the mix pipe subassembly 34, the exhaust gas 12 and gaseous products of decomposition of the reductant 32 flow into the SCR unit 26. The SCR unit is adapted to increase a rate of reaction of NOx in the exhaust gas 12 with ammonia resulting from decomposition of the reductant 32.

Referring to FIGS. 2A-2B, a portion of an exhaust assembly 60 according to the principles of the present disclosure is provided. The exhaust assembly 60 is adapted to receive exhaust gas 62 from a combustion engine (see, e.g., combustion engine 14 of FIG. 1) and discharge the exhaust gas 62 during operation of the combustion engine. The exhaust assembly 60 generally includes a reductant injector 64, a mix box 66 including a mixer 68 (shown in FIG. 2B), a mix tube subassembly 70 (also referred to as the "subassembly 70"), and an SCR unit 72.

As shown in FIG. 2B, the mix box 66 houses the mixer 68. The mixer 68 and mix box 66 are adapted to receive the exhaust gas 62 from the combustion engine and a chemical reductant from the reductant injector 64. The mixer 68 is upstream of and in fluid communication with an interior of the mix tube subassembly 70. The mixer 68 is a non-impingement mixer, as described above in the discussion accompanying FIG. 1. The mixer 68 has a generally annular shape and extends along an axis 80. The axis 80 may be generally parallel to a direction of flow of the exhaust gas 62 in the mixer 68. The mixer 68 includes a plurality of axially-extending, circumferentially-spaced louvers 82. The louvers 82 are alternatingly disposed with a respective plurality of slots 84. All or a portion of the louvers 82 may define a plurality of apertures 86.

Returning to FIG. 2A, the mix tube subassembly 70 is disposed between the mix box 66 and the SCR unit 72. More specifically, the mix tube subassembly 70 is downstream of the mix box 66 and upstream of the SCR unit 72. The mix tube subassembly 70 and its operation are described in greater detail below in the discussion accompanying FIG. 3.

With reference to FIG. 3, the mix tube subassembly 70 of FIGS. 2A-2B is shown. The subassembly 70 generally includes a mix pipe 100, a sheath 102, a heater 104, and an insulator 106. The sheath 102 may be disposed radially inside of the mix pipe 100, as shown.

The mix pipe 100 at least partially defines a passage 108. The passage 108 extends between an inlet 110 and an outlet 112. The passage 108 is adapted to receive exhaust gas 114 and droplets of a chemical reductant 116.

The sheath 102 may have an annular shape. The sheath 102 includes a first or upstream end 120 and a second or downstream end 122. At least a portion of the sheath 102 is spaced apart from the mix pipe 100 to define a gap 124 (e.g., an air gap). At least one of the first end 120 and the second end 122 of the sheath 102 is fluidly sealed to the mix pipe 100, such as the first end 120, as shown. The first end 120 may be fluidly sealed to the mix pipe 100 by welds 126. The second end 122 may be in physical contact with the mix pipe 100, but not fluidly sealed to the mix pipe 100. Accordingly, the gap 124 may be partially isolated from the passage 108. As a result, air in the gap 124 may be mostly quiescent and heat loss through the gap 124 may be reduced or minimized compared to a gap having airflow therethrough. As pressure in the gap 124 increases due to expansion of the air as it is heated, the air may escape from the gap between the second end 122 of the sheath 102 and the mix pipe 100, such as by flexing of the sheath 102 away from the mix pipe 100.

The heater 104 is disposed in the gap 124. The heater 104 is adapted to heat a reductant impingement surface 130. The reductant impingement surface 130 may be on the sheath 102, as shown, and/or on the mix pipe (see, e.g., FIG. 6). In the example shown, the reductant impingement surface 130 is a portion of an inner surface 132 of the sheath 102. In at least one example embodiment, the impingement surface 130 is a portion less than 100% of the inner surface 132 of the sheath 102.

The heater 104 may be fixed opposite the reductant impingement surface 130. Accordingly, in the example embodiment shown, the heater 104 is fixed to an outer surface 134 of the sheath 102. The heater 104 may be coupled to the sheath 102 by an adhesive, one or more clamps, or both adhesive and one or more clamps (not shown). The heater 104 may be directly coupled to the outer surface 134 of the sheath 102. The heater 104 may be in direct thermal contact with the sheath 102.

The heater 104 may be spaced apart from the mix pipe 100 by a distance 144. Accordingly, the heater 104 may not be in direct thermal contact with the mix pipe 100. Instead, air in the gap 124 across the distance 144 may act as an insulator between the heater 104 and the mix pipe 100. The location of the heater 104 may facilitate reduced or minimized heat loss to an environment 146 outside of the subassembly 70 compared to a heater in direct thermal contact with a mix pipe.

The heater 104 may have a substantially annular shape such that it wraps around an entire perimeter of the outer surface 134 of the sheath 102. In other example embodiments, the heater 104 includes or more discrete heaters. A plurality of discrete heaters may be circumferentially spaced about the outer surface 134 and/or axially spaced along the outer surface 134 (see, e.g., FIG. 4). The plurality of heaters may independently operable.

The mix pipe 100 includes an inner surface 140 and an outer surface 142. The sheath 102 may be directly fixed to the inner surface 140 of the mix pipe 100. The insulator 106 may be disposed on and around all or a portion of the outer surface 142 of the mix pipe 100. The insulator 106 includes a thermally-insulating material. The insulator 106 may facilitate a reduction in heat loss to the environment 146 compared to a subassembly 70 without an insulator.

The mix pipe 100 defines a first length 150 parallel to an axis A1 of the subassembly 70. The sheath 102 defines a second length 152 parallel to the axis A1. The second length 152 is less than the first length 150. In at least one example embodiment, the second length 152 may be less than or equal to about 90% of the first length (e.g., less than or equal to about 80%, less than or equal to about 70%, less than or equal to about 60%, less than or equal to about 50%, less than or equal to about 40%, or less than or equal to about 30%). The difference in first and second lengths 150, 152 may facilitate a reduction in heat loss to the exhaust gas 114 in the passage 108 compared to a subassembly including a mix pipe and sheath having substantially similar lengths. The sheath 102 may be positioned along the longitudinal axis A1 at a location of highest expected reductant impingement flux.

As used herein, reductant impingement flux refers to a rate of reductant flow that impinges or lands on a surface of the subassembly 70 (i.e., the reductant impingement surface 130). Reductant impingement flux may be measured by mass, mol, or volume flow rate of reductant 116 that impinges or lands of the reductant impingement surface 130. In some examples, a thickness of a liquid reductant film 153 on the reductant impingement surface 130 may be indicative of reductant impingement flux.

The heater 104 defines a third length 154 parallel to the axis A1. The third length 154 is less than the second length 152 of the sheath 102. This difference in second and third lengths 152, 154 may facilitate a reduction in heat loss to exhaust gas 114 in the passage 108 compared to a subassembly including a sheath and heater having substantially similar lengths. The heater 104 may be positioned along the longitudinal axis A1 in at a location of highest expected reductant impingement flux.

In at least one example embodiment, the passage 108 includes one or more first wall portions 160, one or more second wall portions 162, and one or more third wall portions 164. The first wall portions 160 may be expected to be substantially free of liquid reductant deposits during operation. The second and third portions 162, 164 may be expected to be impinged by reductant to form the liquid reductant film 153. Accordingly, the sheath 102 is substantially axially aligned with the second and third wall portions 162. The second and third wall portions 162, 164 may include the reductant impingement surface 130. The third wall portion 164 may be expected to receive a higher reductant impingement flux than the second wall portions 162. Accordingly, the heater 104 is substantially axially aligned with the third wall portion 164.

In some examples, a thickness of the film 153 may be indicative of reductant impingement flux. The film 153 may therefore define a first film thickness 166 on the second portion 162 that is less than a second film thickness 168 on the third portion 164 during operation of the engine.

A material of the sheath 102 and dimensions of the sheath 102 may be optimized to achieve desired heat transfer characteristics. For example, when lower conductivity is desired, a thinner sheath formed from a lower thermal conductivity material may be used. The use of a lower conductivity sheath may reduce or minimize heat transfer through the sheath to limit heat transfer to the exhaust (rather than the reductant). When a higher conductivity is desired, a thicker sheath formed from a higher thermal conductivity material may be used. In at least some example embodiments, the sheath 102 defines a sheath thickness 170 ranging from about 0.75 mm to about 2 mm. In at least some example embodiments, the sheath 102 comprises stainless steel. The surfaces 132, 134 of the sheath 102 may be substantially smooth to minimize heat loss to the exhaust gas 114 and/or air in the passage 108 and/or the gap 124.

The subassembly 70 may be adapted to efficiently heat the reductant while minimizing power consumption. More specifically, axial locations of the sheath 102 and heater 104 are at regions (e.g., second and third wall portions 160, 162) of highest expected reductant impingement flux to reduce or minimize heat loss to the exhaust gas 114. The heater 104 is disposed in the gap 124 and spaced the distance 144 from the mix pipe 100 to reduce or minimize heat loss to the environment 146. Furthermore, the sheath 102 is at least partially fluidly sealed to the mix pipe 100 to further reduce or minimize heat loss through the gap 124. Additionally, thickness and material of the sheath 102 are selected to optimize conductivity such that the heater 104 effectively heats the impingement surface 130 to evaporate and thermally decompose reductant while minimizing heating of other areas of the sheath 102 with little or no reductant impingement flux (which would result in heat being transferred to the exhaust gas 114). The above design features, which narrowly tailor heating to regions of highest expected reductant impingement flux and minimize heat loss to the exhaust gas 114 and environment 146, facilitate an efficient use of heat and therefore may require a lower power than devices lacking some or all of the features. In at least one example embodiments, the heater may be operated at a power ranging from about 1 kW to about 2 kW. Accordingly, the subassembly 70 may be used with a 24-48 V vehicle system without adding an additional power supply to support the exhaust treatment system.

Referring to FIG. 4, another mix tube subassembly 200 (also referred to as the "subassembly 200") according to the principles of the present disclosure is provided. Except as otherwise described below, the subassembly 200 is the same the subassembly 70 of FIGS. 2A-3. The subassembly 200 generally includes a mix pipe 202, a sheath 204, a first heater 206, a second heater 208, and an insulator 210. The subassembly 200 may be adapted to receive an exhaust gas 212.

The subassembly 200 may include one or more first wall portions 214, one or more second wall portions 216, and one or more third wall portions 218. The first wall portions 214 may be expected to be substantially free of reductant deposits during operation. The second and third wall portions 216, 218 may be expected to be impinged by a reductant 219 to form a liquid reductant film 220. The second and third wall portions 216, 218 may include a reductant impingement surface 222. The third portion 218 may be expected to receive a higher reductant impingement flux than the second portions 216.

The first and second heaters 206, 208 may be adapted to heat the reductant impingement surface 222. The impingement surface 222 may be adapted to be impinged by the reductant 219, which may form the film 220. The first and second heaters 206, 208 may be disposed on the sheath 204 at different axial locations. The first and second heaters 206, 208 may be axially spaced apart. The first heater 206 may be adapted to heat reductant impingement surface 222 on the second wall portion 216 and the second heater 208 may be adapted to heat the third portion of the reductant impingement surface 222 on the third wall portion 218.

The first and second heaters 206, 208 may be independently operable. Accordingly, if a location of highest reductant impingement flux changes, operation of the heaters 206, 208 may be changed (e.g., operated at a different power or turned on or off) in response. In at least one example embodiment, the first heater 206 may be operated at a lower power than the second heater 208 when reductant impingement flux is higher in the second portion 226 than the first portion 224.

With reference to FIGS. 5-6, an exhaust treatment assembly 300 according to the principles of the present disclosure is provided. The exhaust treatment assembly 300 may generally include a reductant injector 301 (Shown in FIG. 6), a mixer 302, and a mix pipe subassembly 304 (also referred to as the "subassembly 304"). The mixer 302 may be a non-impingement mixer. The mix pipe subassembly 304 may be the same or similar to the mix pipe subassembly 70 of FIGS. 2A-3 except as otherwise described below. The exhaust treatment assembly 300 may be adapted to receive exhaust gas 306 from a combustion engine (see, e.g., combustion engine 14 of FIG. 1) and a chemical reductant 308 from the reductant injector 301 in the form of liquid droplets.

As shown in FIG. 6, the mix pipe subassembly 304 includes a mix pipe 310, a sheath 312, and a heater 314. The subassembly 304 may further include an insulator (not shown) around all or a portion of the sheath 312. The mix pipe 310 may at least partially define a passage 316.

At least a portion of the sheath 312 is disposed radially outside of the mix pipe 310. The sheath 312 is spaced apart from the mix pipe 310 to define a gap 318. The heater 314 is disposed in the gap 318.

The heater 314 is adapted to heat a reductant impingement surface 320. The reductant impingement surface 320 is on the mix pipe 310. More specifically, the heater 314 is coupled to an outer surface 322 of the mix pipe 310 to heat the impingement surface 320, which is all or a portion of an inner surface 324 of the mix pipe 310. The reductant impingement surface 320 may be adapted to receive the reductant 308. The reductant 308 may form a reductant film 326 on the reductant impingement surface 320.

The sheath 312 may include a first or upstream end 330 and a second or downstream end 332. The first end 330 may be fluidly sealed to the mix pipe 310. The second end 332 may be fluidly connected to the passage 316 such that the gap 318 is a partial air gap. Additionally or alternatively, the second end 332 of the sheath 312 may be fluidly sealed to the mix pipe 310 (not shown). The sheath 312 may be fluidly sealed to the mix pipe 310 by a weld 334.

Figure 7:
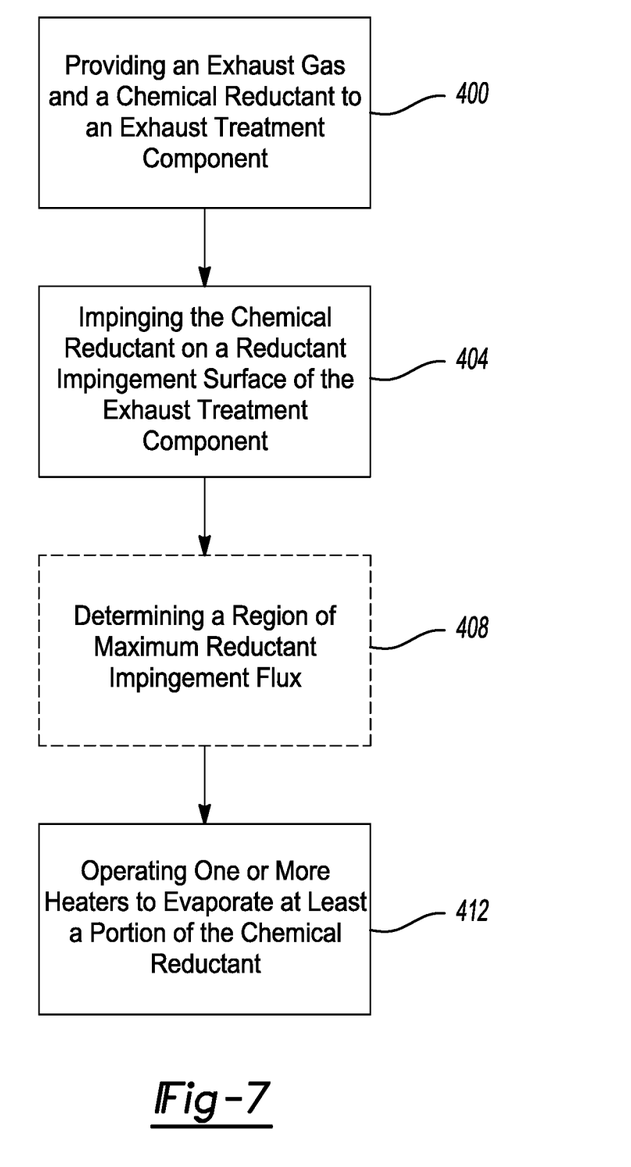
FIG. 7 is a flowchart depicting a method of reducing chemical reductant deposits on an exhaust treatment component according to the principles of the present disclosure.

Referring to FIG. 7, a flowchart depicting a method of reducing chemical reductant deposits on an exhaust treatment component according to the principles of the present disclosure is provided. At 400, the method includes providing an exhaust gas and a chemical reductant to an exhaust treatment component. The exhaust treatment component may include the mix tube subassembly 70 of FIGS. 2A-3, the mix tube subassembly 200 of FIG. 4, or the exhaust treatment assembly 300 of FIGS. 5-6, by way of example.

At 404, the method includes impinging the chemical reductant on a reductant impingement surface of the exhaust treatment component. The chemical reductant may include DEF. The chemical reductant may be adapted to impinge or land on a desired area of the exhaust treatment component (e.g., the impingement surface). As described above, the reductant may be injected into a mixer and remain substantially airborne until being evaporated and thermally decomposed or landing as liquid droplets onto the reductant impingement surface to form a reductant film.

At 408, the method optionally includes determining a region of maximum reductant impingement flux, such as when the exhaust treatment assembly includes multiple independently operable heaters. The region of maximum reductant impingement flux may be determined by engine speed (which indicates air and fuel flow), exhaust temperature (which may be measured), and/or reductant flow (which may be known from set points and/or sensors).

At 412, the method further includes operating one or more heaters to evaporate at least a portion of the chemical reductant. The heaters may be adapted to heat the reductant to a temperature that will maximize thermally-induced breakup (TBU) of the reductant while minimizing surface spread, splash, rebound, or breakup and rebound. TBU of the reductant may facilitate efficient heat transfer to the reductant. Secondary droplets resulting from TBU may be smaller than initial or primary droplets (prior to impingement) and are therefore more amenable to processing in the downstream exhaust than the primary droplets. In at least some example embodiments, the heaters may be heated to a temperature ranging from about 135° C. to about 275° C.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust treatment assembly for receiving exhaust gas from a motor vehicle, comprising:
    a mix pipe at least partially defining a passage adapted to receive the exhaust gas and a chemical reductant;
    a sheath including a first end fluidly sealed to an inner surface of the mix pipe, at least a portion of the sheath being radially inwardly spaced apart from the mix pipe to at least partially define a gap; and
    a heater disposed in the gap and adapted to heat a reductant impingement surface.

2. The exhaust treatment assembly of claim 1, wherein:
    the sheath is disposed radially inside of the mix pipe,
    the heater is coupled to a radially-outer surface of the sheath, and
    the reductant impingement surface is at least a portion of a radially-inner surface of the sheath.

3. The exhaust treatment assembly of claim 2, wherein the mix pipe defines a first length, and
    the sheath defines a second length less than the first length.

4. The exhaust treatment assembly of claim 2, wherein the sheath defines a wall thickness ranging from 0.75 mm to 2 mm.

5. The exhaust treatment assembly of claim 1, wherein the first end is an upstream end.

6. The exhaust treatment assembly of claim 1, wherein:
    the sheath further includes second end opposite the first end, and
    the second end is adapted to be in direct contact with the mix pipe.

7. The exhaust treatment assembly of claim 6, wherein the sheath includes a central portion positioned between the first end and the second end, the central portion having a reduced inner diameter compared to an inner diameter at the first and second ends.

8. The exhaust treatment assembly of claim 1, wherein the reductant impingement surface is a portion of an inner passage surface, the portion being less than 100%.

9. The exhaust treatment assembly of claim 1, wherein:
    the heater comprises a first heater and a second heater disposed downstream of the first heater, and
    the first heater and the second heater are independently operable.

10. The exhaust treatment assembly of claim 1, wherein the heater defines a substantially annular shape.

11. The exhaust treatment assembly of claim 1, wherein the sheath comprises stainless steel.

12. The exhaust treatment assembly of claim 1, further comprising:
    a thermally-insulating material disposed around at least a portion of at least one of the mix pipe and the sheath.

13. The exhaust treatment assembly of claim 1, further comprising:
    a mixer fluidly connected to the passage upstream of the heater.

14. The exhaust treatment assembly of claim 1, further comprising:
    a chemical reductant injector adapted to spray the chemical reductant into the passage, the chemical reductant injector being disposed upstream of the heater.

15. The exhaust treatment assembly of claim 1, further comprising:
    a selective catalytic reduction (SCR) unit downstream of the mix pipe.

16. A method of reducing chemical reductant deposits in an exhaust system of a vehicle, the method comprising:
    providing an exhaust gas and a chemical reductant to a passage of an exhaust treatment component, the exhaust treatment component including a mix pipe, a sheath, and a heater, the mix pipe at least partially defining the passage, the sheath radially inwardly spaced apart from the mix pipe to at least partially define a gap, a first end of the sheath being fluidly sealed to an inner surface of the mix pipe, and the heater disposed in the gap;
    impinging the chemical reductant on a reductant impingement surface of the passage; and
    heating the reductant impingement surface with the heater.

17. The method of claim 16, wherein heating includes bring the reductant impingement surface to a temperature ranging from 135° C. to 275° C.

18. The method of claim 16, wherein heating includes supplying power to the heater in an amount ranging from 1 kW to 2 kW.

19. The method of claim 16, wherein the heater includes a first heater and a second heater, the first heater and the second heater being independently operable.

20. The method of claim 19, further comprising:
    determining a region of high reductant impingement flux on the reductant impingement surface, wherein heating the reductant impingement surface includes operating at least one of the first heater and the second heater based on the region of maximum reductant impingement.

* * * * *